United States Patent
Streichert et al.

(10) Patent No.: US 12,188,572 B2
(45) Date of Patent: Jan. 7, 2025

(54) VALVE ARRANGEMENT AND METHOD

(71) Applicant: Festo SE & Co. KG, Esslingen (DE)

(72) Inventors: Thilo Streichert, Stuttgart (DE); Ulrich Sixt, Waiblingen (DE)

(73) Assignee: Festo SE & Co. KG, Esslingen (DE)

( * ) Notice: Subject to any disclaimer, the term of this patent is extended or adjusted under 35 U.S.C. 154(b) by 93 days.

(21) Appl. No.: 17/948,441

(22) Filed: Sep. 20, 2022

(65) Prior Publication Data
US 2023/0092572 A1    Mar. 23, 2023

(30) Foreign Application Priority Data
Sep. 21, 2021 (DE) ...................... 10 2021 210 500.9

(51) Int. Cl.
*F16K 31/06* (2006.01)
*F16K 37/00* (2006.01)
*G01M 3/28* (2006.01)

(52) U.S. Cl.
CPC .......... *F16K 31/06* (2013.01); *F16K 37/0091* (2013.01); *G01M 3/2876* (2013.01); *F16K 37/0083* (2013.01); *Y10T 137/8326* (2015.04); *Y10T 137/87885* (2015.04)

(58) Field of Classification Search
None
See application file for complete search history.

(56) References Cited

U.S. PATENT DOCUMENTS

| | | | |
|---|---|---|---|
| 6,220,284 B1 * | 4/2001 | Hayashi ............... | F15B 15/2807 137/554 |
| 6,263,915 B1 * | 7/2001 | Hayashi ............... | F15B 15/2861 137/554 |
| 6,267,140 B1 * | 7/2001 | Hayashi ............... | F15B 13/0402 137/554 |
| 7,926,409 B2 * | 4/2011 | Arbter ................. | F15B 13/0889 91/459 |
| 11,255,355 B2 | 2/2022 | Doll et al. | |

(Continued)

FOREIGN PATENT DOCUMENTS

DE    10 2004 017 894 B3    11/2005
DE       102 58 873 B4     6/2009
(Continued)

*Primary Examiner* — Matthew W Jellett
(74) *Attorney, Agent, or Firm* — Hoffmann & Baron, LLP

(57) ABSTRACT

A valve arrangement (10) for industrial automation, including at least one pneumatic valve module (4) with a module housing (5), the valve module (4) having a working port (2), an electric drive device, and at least one actuator element (6) which is arranged in the module housing (5), can be positioned, in particular proportionally, by means of the electric drive device and via whose position a valve module output pressure at the working port (2) and/or a flow rate through the working port (2) can be set, wherein the valve module (4) further has a valve module pressure sensor (7) for detecting the valve module output pressure, the valve arrangement (10) further including a diagnostic device (8) which is configured to provide a diagnostic function on the basis of the detected valve module output pressure, the diagnostic function including a failure prognosis of the valve module, a compressed air leakage detection, a compressed air consumption detection and/or a compressed air consumer localization.

19 Claims, 4 Drawing Sheets

(56) References Cited

U.S. PATENT DOCUMENTS

| | | |
|---|---|---|
| 2003/0125841 A1 | 7/2003 | Schlosser |
| 2005/0240807 A1 | 10/2005 | Gebauer et al. |
| 2006/0011240 A1* | 1/2006 | Berner ................ F15B 13/0889 137/557 |
| 2008/0065355 A1 | 3/2008 | Bredau et al. |
| 2024/0077090 A1* | 3/2024 | Okada ................... F15B 13/044 |

FOREIGN PATENT DOCUMENTS

| | | |
|---|---|---|
| DE | 10 2007 039 663 B4 | 1/2011 |
| DE | 10 2016 107 407 A1 | 5/2017 |
| DE | 10 2019 135 575 A1 | 6/2021 |
| EP | 1 812 718 B1 | 8/2007 |

* cited by examiner

VALVE ARRANGEMENT AND METHOD

BACKGROUND OF THE INVENTION

The invention relates to a valve arrangement for industrial automation. The valve arrangement comprises at least one pneumatic valve module with a module housing. The valve module has a working port, an electric drive device, and at least one actuator element which is arranged in the module housing and can be positioned, in particular proportionally, by means of the electric drive device. Via the position of the at least one actuator element, a valve module output pressure at the working port and/or a flow rate through the working port can be set. The valve module also has a valve module pressure sensor for detecting the valve module output pressure.

SUMMARY OF THE INVENTION

It is an object of the invention to provide a valve arrangement that provides efficient and/or reliable operation.

The object is solved by a valve arrangement according to claim 1. The valve arrangement comprises a diagnostic device which is configured to provide a diagnostic function based on the detected valve module output pressure. The diagnostic function comprises a failure prognosis of the valve module, a compressed air leakage detection, a compressed air consumption detection and/or a compressed air consumer localization.

Advantageous further developments are defined in the dependent claims.

The invention further relates to a method of operating the valve arrangement. The method comprises the steps of: detecting the valve module output pressure; and providing the diagnostic function based on the detected valve module output pressure.

BRIEF DESCRIPTION OF THE DRAWINGS

Further exemplary details as well as exemplary embodiments are explained below with reference to the figures. Thereby shows FIG. 1 a schematic representation of a valve module, FIG. 2 an exemplary design of the valve module in a perspective view, FIG. 3 a series arrangement of several valve modules, FIG. 4 a block diagram of a valve arrangement, and FIG. 5 a flowchart of a signal processing procedure for detecting an anomaly.

DETAILED DESCRIPTION

Figure 1:
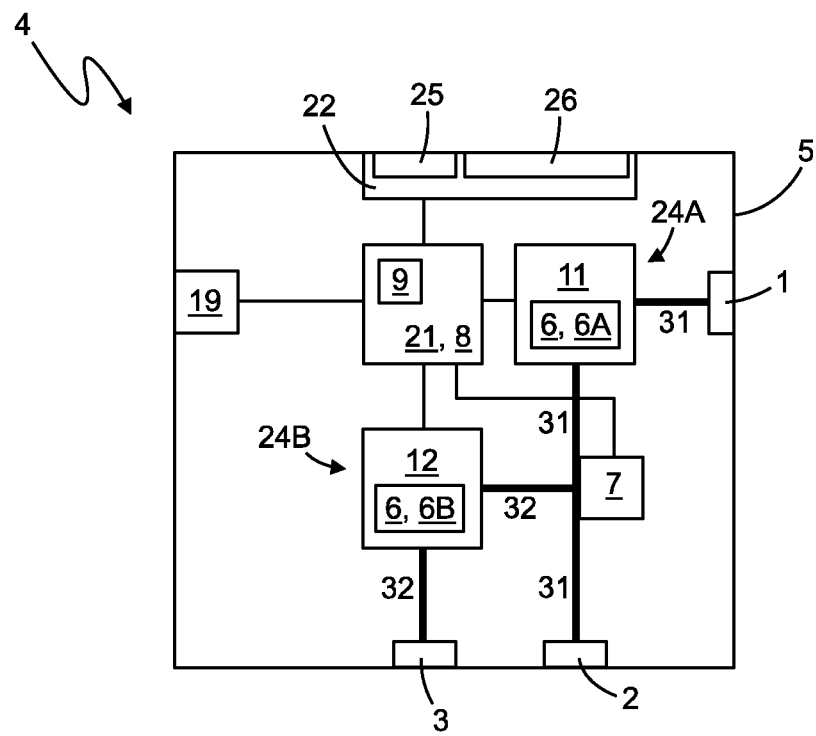

FIG. 1 shows a valve module 4. The valve module 4 can be provided by itself. In particular, the valve module 4 can form a valve arrangement by itself. Furthermore, the valve module 4 can be part of a valve arrangement (for example, part of the valve arrangement 10 shown in FIG. 4) that has other components in addition to the valve module 4.

The valve module 4 is designed in particular for use in industrial automation and can expediently also be referred to as an industrial automation valve module. The valve module 4 is a pneumatic valve module 4 and expediently serves to influence a supply of compressed air.

The valve module 4 preferably has a module housing 5, a working port 2, an electrical drive device, at least one actuator element 6 and/or a valve module pressure sensor 7. Preferably, the drive device, the at least one actuator element 6 and/or the valve module pressure sensor 7 is arranged in the module housing 5. Expediently, the working port 2 is arranged on the outside of the module housing 5. Preferably, the valve module 4 comprises two actuator elements 6, which are expediently arranged in the module housing 5. The two actuator elements 6 comprise a first actuator element 6A and a second actuator element 6B.

Preferably, the valve module 4 further comprises a supply port 1, a vent port 3, a control unit 21 and/or a user interface 22. The vent port 3 may also be referred to as de-aeration port. The supply port 1, the vent port 3 and/or the user interface 22 are expediently arranged on the outside of the module housing 5. The control unit 21 is preferably arranged in the module housing 5.

The supply port 1 is expediently used to connect the valve module 4 to a compressed air supply, for example a supply unit 14 which will be explained in more detail below. The supply port 1 is designed as a hose port, for example.

The working port 2 is expediently used to connect the valve module 4 to a pneumatic component 23, for example a pneumatic actuator, in particular a pneumatic consumer, which will be explained in more detail below. The valve module is designed to set a predetermined pressure and/or a predetermined flow rate at the working port 2. The working port 2 is designed, for example, as a hose port.

The vent port 3 is used in particular for venting compressed air into a compressed air sink, for example the surroundings of the valve module 4. The vent port 3 can be designed as a hose port, for example.

The valve module 4 comprises a first valve unit 24A, which is expediently used to set a first pneumatic connection between the supply port 1 and the working port 2. Preferably, the valve module 4 further comprises a second valve unit 24B, which is expediently used to set a second pneumatic connection between the working port 2 and the vent port 3.

Exemplarily, the first valve unit 24A comprises a first electric drive 11 and the first actuator element 6A positionable by the first electric drive 11. The first electric drive 11 and the first actuator element 6A are preferably arranged in the module housing 5. The first electric drive 11 is expediently configured as a plunger coil drive. Exemplarily, the second valve unit 24B comprises a second electric drive 12 and the second actuator element 6B positionable by the second electric drive. The second electric drive 12 and the second actuator element 6B are preferably arranged in the module housing 5. The second electric drive 12 is expediently designed as a plunger coil drive.

The valve module 4 comprises a first pneumatic path 31 running from the supply port 1 via the first valve unit 24A to the working port 2. The valve module 4 further comprises a second pneumatic path 32 running from the working port 2 via the second valve unit 24B to the vent port 3. The first pneumatic path 31 and/or the second pneumatic path 32 is expediently disposed within the module housing 5.

The electric drive device expediently comprises the first electric drive 11 and/or the second electric drive 12. By means of the electric drive device, the actuator elements 6 are positionable, in particular proportionally positionable. By the term proportionally positionable is meant in particular that the actuator elements can be moved into a plurality of intermediate positions, in particular into arbitrary intermediate positions, between two end positions. Preferably, the first valve unit 24A and/or the second valve unit 24B is designed as a proportional valve.

A first flow cross-section on the first pneumatic path 31 can be set via the position of the first actuator element 6A.

Compressed air can flow through the first flow cross-section from the supply port 1 to the working port 2. The first actuator element 6A is movable to a blocking position in which the first flow cross-section is zero, so that the first pneumatic path 31 is blocked and no compressed air can flow from the supply port 1 to the working port 2. The first actuator element 6A is further movable to an open position, in which the flow cross-section is maximum. Expediently, the first actuator element 6A is further movable to a plurality of intermediate positions between the blocking position and the open position. The blocking position and the open position are end positions of the first actuator element 6A.

A second flow cross-section on the second pneumatic path 32 can be set via the position of the second actuator element 6B. Compressed air can flow through the second flow cross-section from the working port 2 to the vent port 3. The second actuator element 6B is movable to a blocking position in which the second flow cross-section is zero, so that the second pneumatic path 32 is blocked and no compressed air can flow from the working port 2 to the vent port 3. The second actuator element 6B is further movable to an open position in which the flow cross-section is at a maximum. Expediently, the second actuator element 6B is further movable to a plurality of intermediate positions between the blocking position and the open position. The blocking position and the open position are end positions of the first actuator element 6B.

The valve module 4 is designed to adjust an output pressure at the working port 2 and/or a flow rate through the working port 2 via the position of the actuator elements 6. The output pressure at the working port 2 shall also be referred to as the valve module output pressure. Exemplarily, the control unit 21 is configured to perform closed-loop pressure control of the output pressure based on a target output pressure. Expediently, during the closed-loop pressure control, the valve module 4 detects the output pressure present at the working port 2 (in particular as actual output pressure) by means of the valve module pressure sensor 7 and adjusts the position of the actuator elements 6 by means of the electric drive device in such a way that the output pressure changes towards the target output pressure. Optionally, the control unit 21 is designed to calculate the target output pressure itself and/or to receive it from an external unit, for example a superordinate controller.

Preferably, the valve module pressure sensor 7 is arranged on the first pneumatic path 31 between the first valve unit 24A and the working port 2, or is arranged at the working port 2. In particular, the valve module pressure sensor 7 is arranged downstream of the first valve unit 24A with respect to the direction of flow of the compressed air. The valve module pressure sensor 7 is used to detect the valve module output pressure. In particular, the valve module 4 is configured to sense the valve module output pressure with the valve module pressure sensor 7.

The communication interface 19 is designed in particular as an IO-Link communication interface. Optionally, the communication interface 19 is designed as a network interface, which is in particular different from an IO-Link communication interface. In particular, the valve module 4 is designed to communicate with an external unit, for example a superordinate controller and/or an IO-Link master, via the communication interface 19 based on the IO-Link communication standard. Optionally, the communication interface 19, in particular the IO-Link communication interface, is the only communication interface of the valve module 4 (in particular for external communication).

The control unit 21 is designed as a microcontroller, for example. The control unit 21 is expediently communicatively connected to the first valve unit 24A, the second valve unit 24B, the valve module pressure sensor 7, the communication interface 19 and/or the user interface 22.

The user interface 22 includes an input device 25 via which a user can perform an user input to the valve module 4. The input device 25 comprises, for example, one or more buttons. Exemplarily, the user interface 22 further comprises a display unit 26, for example a graphical display, via which the valve module 4 can display output information to the user.

Expediently, the valve module 4 is designed to detect a position of the actuator elements 6, in particular a position of the first actuator element 6A and/or a position of the second actuator element 6B, and preferably to provide the detected position as position information. The position of each actuator element 6 is in particular the stroke of the respective actuator element. For example, the valve module 4 has a respective stroke sensor for each actuator element for detecting the stroke of the respective actuator element.

Preferably, the valve module 4 is configured to detect a first electric current provided to the first electric drive 11 and/or a second electric current provided to the second electric drive 12, and preferably to provide the detected first electric current and/or the detected second electric current as drive device current information.

Preferably, the valve module 4 is configured to provide the position information, the drive device current information and/or the detected valve module output pressure via the communication interface 19, in particular via IO-Link. In particular, the position information, the drive device current information and/or the detected valve module output pressure can be read out from the valve module 4 via IO-Link.

Figure 2:
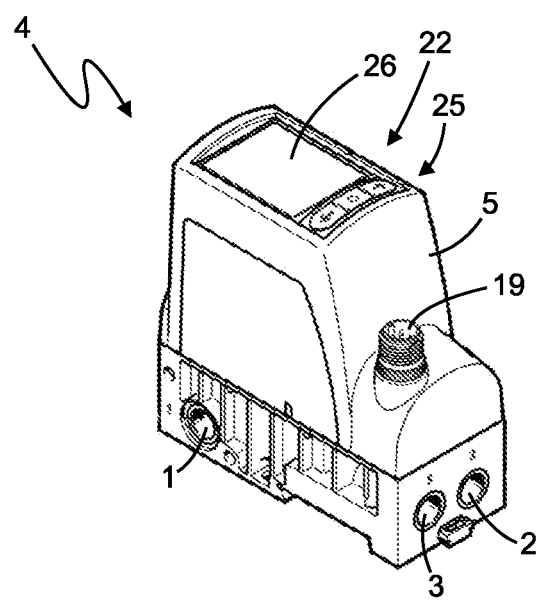

FIG. 2 shows an exemplary embodiment of the valve module 4. Exemplarily, the user interface 22 and/or the communication interface 19 is arranged on a top side of the module housing 5. The working port 2 and/or the vent port 3 are preferably arranged at a front side of the module housing 5. The supply port 1 is preferably arranged on a lateral side of the module housing 5.

The above and/or following explanations relating to one valve module 4 expediently apply to several or all of the valve modules 4 of the valve arrangement 10 (explained in more detail below). Optionally, several or all of the valve modules 4 are of the same design.

Figure 3:
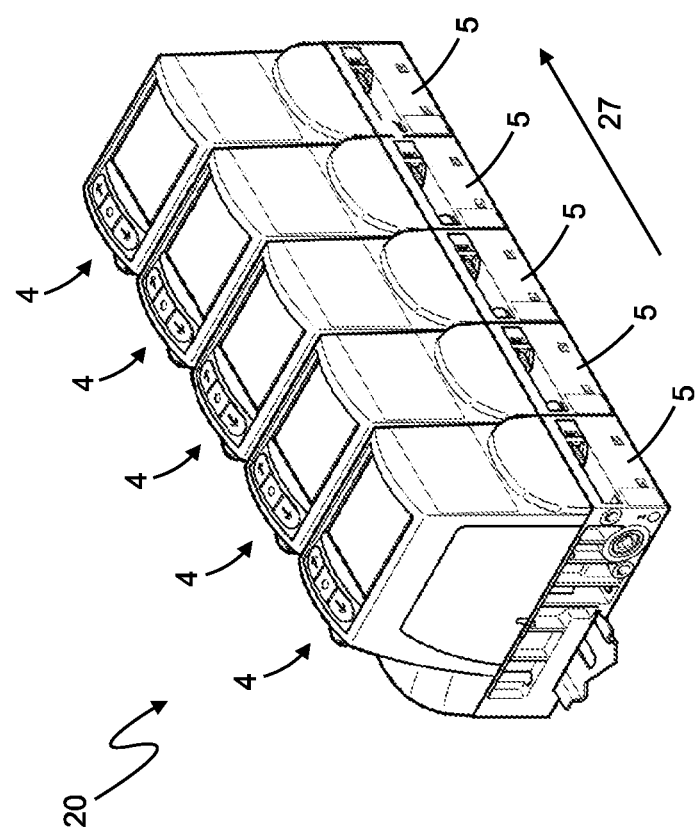

FIG. 3 shows a row arrangement 20 of a plurality of valve modules 4. The valve modules 4 are lined up next to each other in a line-up direction 27. The line-up direction 27 runs in particular orthogonally to the lateral sides of the module housings 5 of the valve modules 4.

Figure 4:
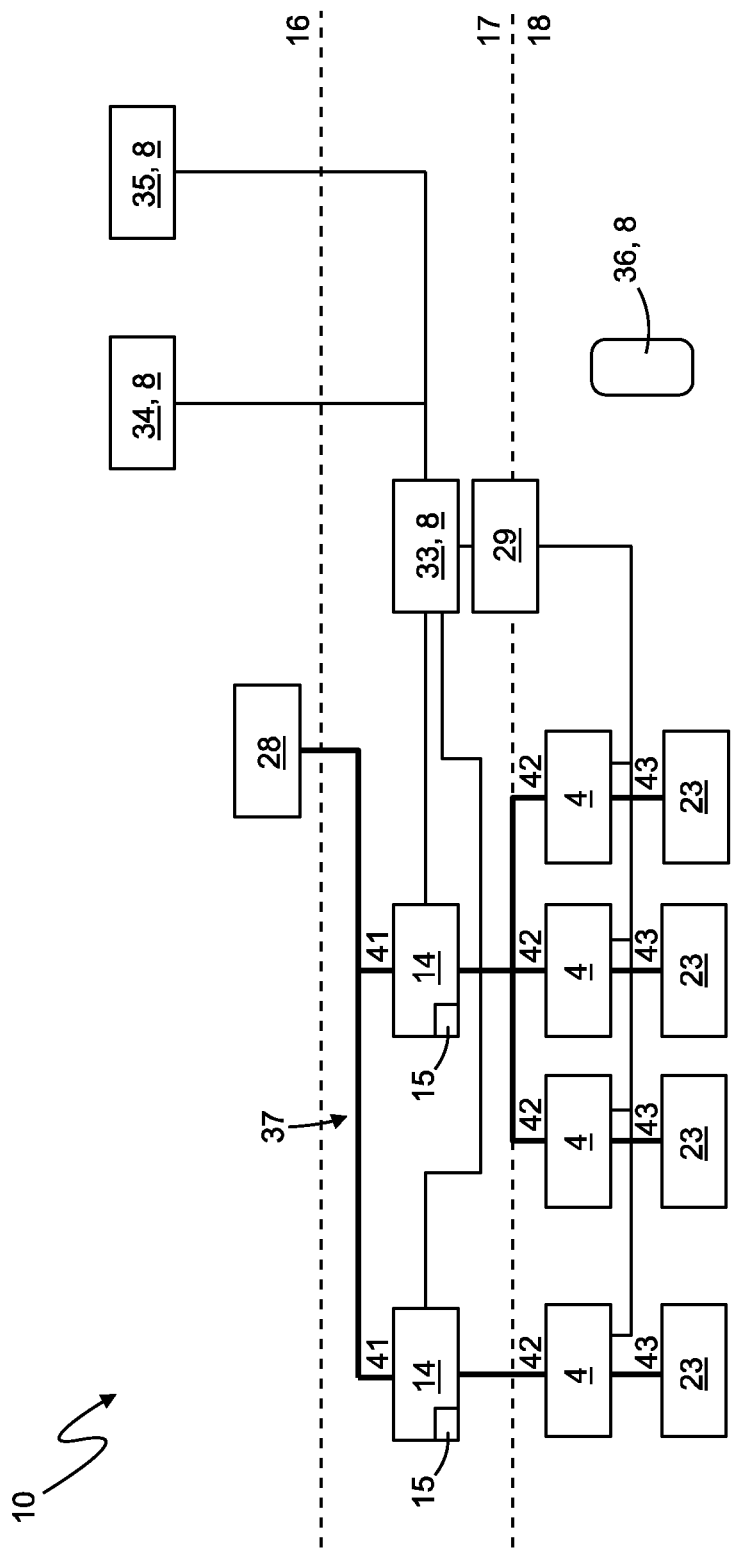

FIG. 4 shows a valve arrangement 10 comprising at least one valve module 4. Exemplarily, the valve arrangement 10 is designed as an industrial automation system with a plurality of valve modules 4.

The valve arrangement 10 comprises, by way of example, a compressed air supply 28 for providing compressed air. The compressed air supply 28 is designed as a separate unit, for example, and in particular has a compressed air supply housing and/or is arranged separately from the other units of the valve arrangement 10, in particular separately from the supply units 14 and/or the valve modules 4.

The valve arrangement 10 further comprises a plurality of supply units 14. Each supply unit 14 is pneumatically connected between the compressed air supply 28 and at least one respective valve module 4. In particular, each supply unit 14 is designed to supply the compressed air provided by the compressed air supply 28 to one or more respective valve modules 4. Preferably, each supply unit 14 is designed as a separate unit and, in particular, has a supply unit housing and/or is arranged separately from the other units of the valve arrangement 10, in particular separately from the other supply units 14, the compressed air supply 28 and/or the valve modules 4. Preferably, each supply unit 14 comprises a respective supply unit pressure sensor 15 for detecting the respective output pressure of the compressed air output by the respective supply unit 14. This output pressure shall also be referred to as supply unit output pressure. Optionally, one, plural or each supply unit 14 comprises a respective supply unit flow sensor for detecting the respective flow rate of the output compressed air. This flow rate shall also be referred to as supply unit flow rate.

Preferably, the valve arrangement 10 comprises one or more pneumatic components 23. Each pneumatic component 23 is designed, for example, as a pneumatic consumer, in particular as a pneumatic actuator. Exemplarily, each pneumatic component 23 is pneumatically connected to a supply unit 14 via a respective valve module 4.

The valve arrangement 10 comprises several pneumatic plants. The term pneumatic plant shall refer to an arrangement comprising a supply unit 14 and valve modules 4 and pneumatic components 23 supplied with compressed air by the supply unit 14. A pneumatic plant can also be referred to as pneumatic facility. Optionally, the valve modules 4 of the same pneumatic plant form a row arrangement 20. For example, one, several or each pneumatic plant is designed as a respective production cell.

Preferably, the valve arrangement 10 comprises a hose arrangement 37 via which the compressed air supply 28, the supply units 14, the valve modules 4 and/or the pneumatic components 23 are pneumatically interconnected. Exemplarily, the hose arrangement 37 comprises a plurality of first hose sections 41, second hose sections 42, and third hose sections 43. Exemplarily, a respective first hose section 41 extends from the compressed air supply 28 to each of the supply units 14. Exemplarily, a respective second hose section 42 extends from each supply unit 14 to each valve module 4 associated with the respective supply unit 14. Exemplarily, a respective third hose section 43 extends from each valve module 4 to each pneumatic component 23 associated with the respective valve module 4.

Exemplarily, the hose arrangement 37 has a tree topology extending from the compressed air supply 28. Exemplarily, each pneumatic plant forms a respective strand of the tree topology. In particular, a respective pneumatic path, which shall also be referred to as a partial strand, extends from the compressed air supply 28 to each pneumatic component 23. Exemplarily, each partial strand runs from the compressed air supply 28 via a respective supply unit 14 and a respective valve module 4 to a respective pneumatic component 23.

Preferably, the pneumatic supply of the valve arrangement 10 is hierarchically structured. At a top level, there is the compressed air supply 28, which supplies individual pneumatic plants with compressed air. Preferably, each pneumatic plant has a respective supply unit 14 that is designed to measure the flow and output pressure at its output. Alternatively, it is also possible that one or more pneumatic plants do not have a supply unit 14 that is capable of measuring the flow and output pressure at its output.

Exemplarily, each partial strand has at least one valve module 4 designed as a proportional valve. Alternatively, the valve arrangement 10 may comprise one or more partial strands that do not have a valve module 4 designed as a proportional valve.

Optionally, the valve arrangement 10 has a communication unit 29, which is designed in particular as an IO-Link master. The communication unit 29 is expediently communicatively connected to a plurality of valve modules 4. For example, the communication unit 29 forms an IO-Link communication system with a plurality of valve modules 4.

The valve arrangement 10 expediently has a superordinate unit 33, for example, an edge device, a superordinate controller, a PLC (programmable logic controller), and/or an Internet-of-Things gateway.

The superordinate unit 33 is expediently designed to communicate with the supply units 14, in particular via Ethernet. The superordinate unit 33 is expediently designed to communicate with the valve modules 4, in particular via the communication unit 29.

Optionally, the communication unit 29 is not present. Optionally, the valve modules 4 communicate directly with the superordinate unit 33.

The valve arrangement 10 further comprises, by way of example, a server 34, which is designed in particular as an IT and/or OT server, where IT stands for Information Technology and OT stands for Operation Technology. The server 34 is expediently communicatively connected to the superordinate unit 33.

In an exemplary embodiment, the valve arrangement 10 further comprises a cloud server 35 that is expediently communicatively connected to the superordinate unit 33.

Optionally, the valve arrangement 10 has a user device 36, which is, for example, a mobile device, in particular a smartphone or tablet, or a PC.

The valve arrangement 10 expediently comprises several system levels. The separation between the system levels is exemplarily shown by dashed lines. Exemplarily, the valve arrangement 10 comprises a hall level 16, to which in particular the compressed air supply 28 belongs. The valve arrangement 10 further comprises a system level to which, in particular, the supply units 14 belong. The valve arrangement 10 further comprises a component level 18, to which in particular the valve modules 4 and/or the pneumatic components 23 belong.

Expediently, one, more, or each supply unit 14 is configured to provide supply unit measurement data. The supply unit measurement data comprises, in particular, a supply unit flow rate of compressed air at the output of the supply unit 14 detected by the respective supply unit 14 and/or the supply unit output pressure detected by the respective supply unit 14.

Preferably, one, more or each supply unit 14 is configured to periodically transmit the supply unit measurement data, in particular supply unit output pressure values and/or supply unit flow rate values, to the superordinate unit 33, in particular via Ethernet, preferably to the superordinate unit 33.

Expediently, one, more or each valve module 4 is configured to provide valve module measurement data. In particular, the valve module measurement data comprises a flow rate of compressed air at the working port 2 detected by the respective valve module 4, the valve module output pressure detected by the respective valve module 4, and/or the stroke of one or both actuator elements 6 detected by the respective valve module 4. Preferably, the valve module measurement data comprises the position information and/or the drive device current information.

Preferably, the valve modules 4 are connected via IO-Link to the communication unit 29, which is designed in particular as an IO-Link master. The communication unit 29 is expediently designed to perform a protocol conversion, in particular for transmissions between the valve modules 4 and the superordinate unit 33. Preferably, the valve module measurement data, in particular pressure values of the valve module output pressure and/or stroke values of one or both actuator elements 6, are transmitted from one, several or each valve module 4 to the superordinate unit 33 via the communication unit 29. The stroke values expediently correspond to an opening cross-section of the valve module 4.

Exemplarily, the valve arrangement has a data aggregation device, which is in particular designed to receive and/or aggregate the valve module measurement data from the valve modules 4 and/or the supply unit measurement data from the supply units 14. The data aggregation device is, for example, a software component. Expediently, the superordinate unit 33, the server 34, the cloud server 35, and/or the user device 36 provides the data aggregation device.

The superordinate unit 33, which is designed in particular as an Internet-of-Things gateway, is expediently designed to send data, for example the valve module measurement data and/or the supply unit measurement data to the server 34 and/or the cloud server 35, in particular from the field level. The server 34 and/or the cloud server 35 is preferably designed to process the received data.

The valve arrangement 10 further comprises a diagnostic device 8. The diagnostic device 8 is implemented, for example, as a software component. The diagnostic device 8 is preferably provided, in particular executed, by the control unit 21, the superordinate unit 33, the server 34, the cloud server 35 and/or the user device 36. Optionally, the diagnostic device 8 may be provided on one, several or each valve module 4.

The diagnostic device 8 is designed to provide a diagnostic function based on the detected valve module output pressure. The diagnostic function includes a failure prognosis of the valve module, a compressed air leakage detection, a compressed air consumption detection and/or a compressed air consumer localization.

Preferably, the diagnostic device 8 is configured to take into account a temperature of the first electric drive 11 and/or the second electric drive 12, a coil current in particular of the first electric drive 11 and/or the second electric drive 12, a stroke in particular of the first actuator element 6A and/or the second actuator element 6B, and/or a flow rate when providing the diagnostic function.

In the following, the failure prognosis will be discussed first.

The failure prognosis comprises in particular the provision, in particular calculation, of failure prognosis information, in particular by the diagnostic device 8. The failure prognosis information indicates, for example, a valve module 4 that is expected to fail and/or that should be replaced. Optionally, the failure prognosis information may comprise lifetime information of a valve module 4. For example, the lifetime information indicates a (in particular estimated) remaining lifetime for a valve module 4. Optionally, the failure prognosis, in particular the failure prognosis information, may comprise failure information about a failure present in the valve module 4, for example a wear. The valve arrangement 10, in particular the diagnostic device 8, is expediently configured to store, transmit and/or display the failure prognosis information.

Preferably, the diagnostic device 8 is configured to calculate the failure prognosis on the basis of actuator element distance information. The actuator element distance information represents the total distance covered by one of the actuator elements 6 for the positioning of this actuator element 6. That is, the actuator element distance information represents the total distance that an actuator element 6 has travelled so far during positioning of this actuator element 6. The actuator element distance information is expediently acquired by the respective valve module 4, for example by means of one or both stroke sensors. Optionally, the actuator element distance information comprises a first distance value that represents the total distance traveled by the first actuator element 6A for positioning the first actuator element 6 (for example, in the context of closed-loop pressure control) and/or a second distance value that represents the total distance traveled by the second actuator element 6B for positioning the second actuator element 6B (for example, in the context of closed-loop pressure control). For example, the valve module 4 provides the first distance value and/or the second distance value in the unit "full strokes".

Optionally, the valve module 4 has an internal counter 9 for counting strokes performed with at least one of the actuator elements 6 and is configured to provide the actuator element distance information using the internal counter 9. For example, the internal counter 9 is configured to provide a first count value for the strokes performed with the first actuator element 6A and/or to provide a second count value for the strokes performed with the second actuator element 6B. Expediently, the valve module 4 is configured to provide the actuator element distance information based on the first count value and/or the second count value. Exemplarily, the valve module 4 is designed to transmit the actuator element distance information to the diagnostic device 8, for example as part of the valve module measurement data, in particular via IO-Link.

The actuator element distance information is, for example, the performed stroke performance or stroke power. The distance traveled—i.e. the strokes performed—results from the fact that each actuator element 6 moves in accordance with, in particular proportional to, a set target value, in particular as part of a closed-loop pressure control of the valve module output pressure performed by the valve module 4. Expediently, the valve module 4 is designed to accumulate the distance traveled by each actuator element 6 and, in particular, to provide the accumulated distance in the unit "full strokes", as the actuator element distance information. The distance between the two end positions—i.e. in particular the distance between the blocking position and the open position—is to be referred to as "full stroke".

Expediently, the valve arrangement 10 is designed to transmit the actuator element distance information (in particular in the unit "full strokes") to a central unit, for example the cloud server 35, for example along a communication chain comprising in particular the communication unit 29 and/or the superordinate unit 33. Expediently, the central unit is designed to update the actuator element distance information provided in the central unit on the basis of the actuator element distance information received from the valve module 4 until the end of the life of the valve module 4.

Optionally, the central unit and/or the diagnostic device 8 is designed to receive valve module measurement data, in particular actuator element distance information, from a plurality of valve modules 4 and to perform a statistical analysis of the received valve module measurement data in order to adapt a calculation of the failure prognosis information on the basis of the analysis. Optionally, the central unit and/or the diagnostic device 8 is designed to store the valve module measurement data, in particular the actuator element distance information, in a database.

Preferably, the diagnostic device 8 is configured to calculate the failure prognosis, in particular the failure prognosis information, on the basis of a drive device current information related to the electric drive device. In particular, the drive device current information relates to the current supplied to the electric drive device to position one or more actuator elements 6. In particular, the drive device current information relates to a current consumption of the electric drive device. Preferably, the drive device current information comprises an average current value, a maximum current value and/or a current (in the sense of "present") current value, in particular of the current supplied to the electric drive device. For example, the drive device current information comprises a first drive current information related to the first electric drive 11 and in particular related to the current supplied to the first electric drive 11. For example, the first drive current information comprises a first average current value, a first maximum current value, and/or a first current (in the sense of "present") current value of the current supplied to the first electric drive 11. For example, the drive device current information comprises a second drive current information related to the second electric drive 12 and in particular related to the current supplied to the second electric drive 12. For example, the second drive current information comprises a second average current value, a second maximum current value, and/or a second current (in the sense of "present") current value of the current supplied to the second electric drive 12.

Preferably, the valve module 4 is configured to acquire and/or transmit the drive device current information, in particular the first drive current information and/or the second drive current information, to the diagnostic device 8, for example via IO-Link and/or as part of the valve module measurement data, in particular on request from the diagnostic device 8.

Preferably, the diagnostic device 8 is designed to acquire reference current information and to calculate the failure prognosis on the basis of the reference current information and the drive device current information. In particular, the diagnostic device 8 is designed to acquire the reference current information when the valve arrangement 10 is commissioned (i.e. put into operation). Preferably, the diagnostic device 8 is configured to calculate the failure prognosis based on a comparison of the reference current information with the drive device current information.

Exemplarily, the electric drive device comprises the first electric drive 11 for positioning the first actuator element 6A and the second electric drive 12 for positioning the second actuator element 6B. The diagnostic device 8 is expediently configured to calculate the failure prognosis based on the first drive current information associated with the first electric drive 11 and/or based on the second drive current information associated with the second electric drive 12. For example, the diagnostic device 8 checks whether a deviation between the first drive current information and/or the second drive current information and a respective reference current information exceeds a predetermined threshold value and, in this case, provides a failure prognosis indicating that a failure is likely and/or the valve module 4 concerned should be replaced.

In particular, the diagnostic device 8 is configured to use the failure prognosis to achieve early failure detection of the valve module 4—that is, to predict the failure before the failure has occurred.

Preferably, the valve module 4 provides the user and/or the diagnostic device 8 with a number of values—in particular as the valve module measurement data—on the basis of which wear detection of the valve module 4 is performed, for example by the diagnostic device 8.

Optionally, the valve module is further configured to provide temperature information and the diagnostic device 8 is configured to take the temperature information into account when calculating the failure prognosis, in particular on the basis of the drive device current information. For example, the diagnostic device 8 is configured to compensate for a deviation of the drive device current information from the reference current information caused by a current (in the sense of "present") temperature on the basis of the temperature information when calculating the failure prognosis. For example, the temperature information includes a first temperature value representing a temperature of the first electric drive 11 and/or a second temperature value representing a temperature of the second electric drive 12.

Preferably, the valve arrangement 10, in particular the valve module 4 and/or the diagnostic device 8, is configured to acquire the reference current information, in particular a reference current consumption, for example via a machine cycle and/or during a commissioning of the valve arrangement 10, in particular the commissioning of one of the pneumatic plants. Preferably, the valve arrangement 10, in particular the valve module 4 and/or the diagnostic device 8, is configured to detect a drift, in particular a deviation, of the drive device current information from the reference current information after the reference current information has been acquired and, expediently, to calculate the failure prognosis on the basis of the drift.

Optionally, the diagnostic device 8 is configured to distinguish different fault states of the valve module 4 on the basis of the first drive current information and/or the second drive current information. In particular, the diagnostic device 8 is configured to detect a fault state from among a plurality of fault states detectable by the diagnostic device 8 on the basis of the first drive current information and/or the second drive current information, and to provide fault information in accordance with the detected fault state.

For example, the diagnostic device 8 is configured to determine, on the basis of first drive current information indicating an increased current consumption (in particular relative to a reference current consumption) of the first electric drive 11, that there is a leakage at the working port 2, an internal leakage and/or a sluggish or stiff (or rough-running) first actuator element 6A and, in accordance with this determination, to provide corresponding fault information indicating in particular one, several or all of these faults.

For example, the diagnostic device 8 is configured to determine, on the basis of a first drive current information indicating a reduced current consumption (in particular relative to a reference current consumption) of the first electric drive 11, that a smooth-running or free-moving first actuator element 6A is present and, in accordance with this determination, to provide a corresponding fault information suitably indicating this fault.

For example, the diagnostic device 8 is adapted to determine, based on second drive current information indicating increased current consumption (particularly relative to a reference current consumption) of the second electric drive 12, that there is an overflow from the supply port 1 to the vent port 3 and/or increased friction of the second actuator element 6B and, in accordance with this determination, to provide corresponding fault information expediently indicating one or both of these faults.

For example, the diagnostic device 8 is adapted to determine, on the basis of second drive current information indicating a reduced current consumption (in particular relative to a reference current consumption) of the second electric drive 12, that there is a leakage at the working port 2 and/or a smooth-running or free-moving second actuator element 6B and, in accordance with this determination, to provide corresponding fault information expediently indicating one or both of these faults.

Preferably, the diagnostic device 8 is configured to provide the failure prognosis based on the fault information and/or to provide the fault information as part of the failure prognosis, in particular as part of the failure prognosis information.

Figure 5:
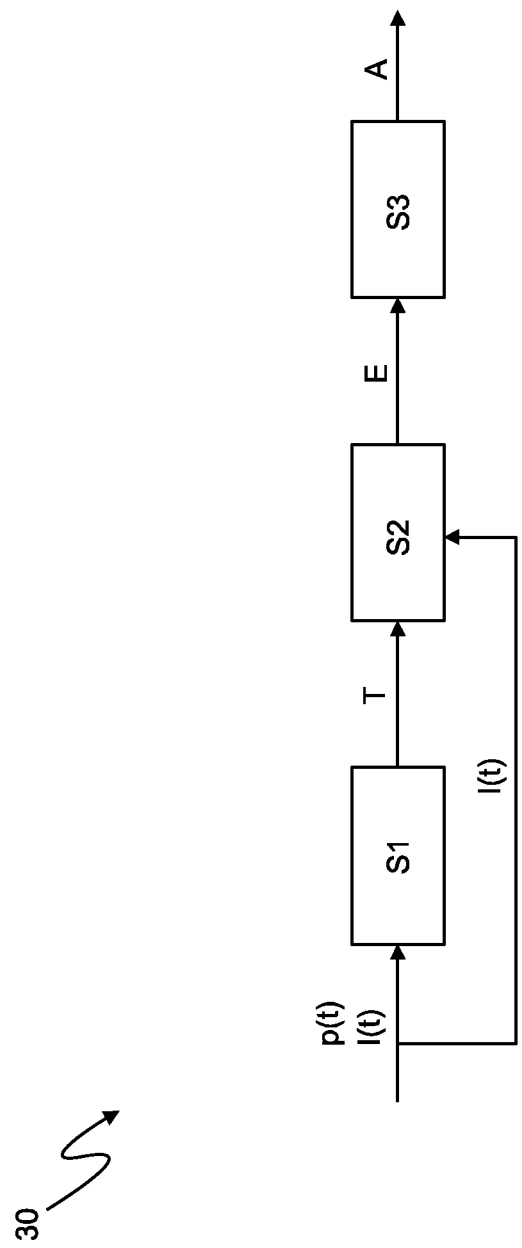

With reference to FIG. 5, a signal processing procedure 30 performed in particular by the diagnostic device 8 for detecting an anomaly A will be discussed below. Preferably, the diagnostic device 8 is configured to provide the fault information and/or the failure prognosis information on the basis of the detected anomaly A.

The signal processing procedure 30 comprises a first processing step S1 in which a diagnostic period T is calculated based on a temporal course p(t) of the valve module output pressure and/or based on a temporal course I(t) of the actuator current information, in particular by the diagnostic device 8.

The temporal course I(t) of the drive device current information expediently comprises a temporal course of the current consumption of the first electric drive 11 and/or a temporal course of the current consumption of the second electric drive 12.

Preferably, in the first processing step S1, a time series analysis is performed based on the temporal course p(t) and the temporal course I(t), in particular by the diagnostic device 8, in order to calculate a periodicity and thus expediently determine the diagnostic period T. For example, the diagnosis period T corresponds to a machine cycle of the valve arrangement 10 and/or a machine cycle of a pneumatic plant of the valve arrangement 10. For example, the temporal course p(t) and/or the temporal course I(t) has a periodicity and the diagnosis period T is the length of a period of this periodicity.

The signal processing procedure 30 further comprises a second processing step S2 in which an integral is calculated over the diagnostic period T based on the drive device current information, in particular by the diagnostic device 8, to obtain an energy information E. Preferably, the integral is calculated as a numerical integral. Preferably, the energy information E is calculated as a numerical integral—i.e. as a sum—of the square of current values of the temporal course I(t) of the drive device current information over the diagnostic period T, i.e. in particular as $E=\Sigma_T I^2$. Preferably, as the energy information E, a first energy information is calculated as numerical integral of the square of current values of the time course of the current consumption of the first electric drive 11 over the diagnostic period T and/or a second energy information is calculated as numerical integral of the square of current values of the time course of the current consumption of the second electric drive 12 over the diagnostic period T, in particular by the diagnostic device 8.

The signal processing procedure 30 further comprises a third processing step S3, in which the anomaly A is detected based on the energy information, in particular the first energy information and/or the second energy information, and expediently based on a reference energy information, in particular by the diagnostic device 8. The anomaly A is, for example, a deviation, in particular a deviation of the energy information, for example the first energy information and/or the second energy information, from the reference energy information. Preferably, the anomaly A is provided as a normalized value, for example as an anomaly score.

Preferably, the diagnostic device 8 is configured to perform the steps S1 and S2 in a state of the valve arrangement 10 in which the anomaly A is not present, for example during commissioning of the valve arrangement 10, in order to learn, in particular to calculate, the reference energy information. The reference energy information expediently represents a normal consumption given when there is no anomaly A.

Preferably, the diagnostic device 8 first performs steps S1 and S2 to obtain the reference energy information, and then (in particular at a later time) performs steps S1, S2, and S3 to detect the anomaly A.

The diagnostic device 8 is designed to calculate the failure prognosis based on the energy information E, in particular based on the detected anomaly A.

By providing the failure prognosis as explained, the advantage of reducing downtime can be achieved in particular, as the failure prognosis allows the user to replace the valve module 4 before it fails.

In the following, compressed air leakage detection will be discussed in more detail.

Preferably, the diagnostic device 8 is configured to set the valve module 4 to a leakage detection mode for the compressed air leakage detection. In leakage detection mode, the valve module 4 first sets a predetermined valve module output pressure and, in particular, positions both actuator elements 6 in the blocking position immediately after setting the predetermined valve module output pressure. The diagnostic device 8 is configured to detect a compressed air leakage on the basis of a temporal course of the valve module output pressure detected in the leakage detection mode.

The term "temporal course" in particular means a time curve.

In particular, the diagnostic device 8 is configured to perform a time monitoring, for example of a pressure drop of the valve module output pressure in the leakage detection mode, to detect the compressed air leakage.

The diagnostic device 8 is expediently configured to provide, in response to the fact that the compressed air leakage detection detects that a compressed air leakage is present, in particular a compressed air leakage at the working port 2, leakage information indicating that a compressed air leakage is present. Optionally, the diagnostic device 8 is configured to store, transmit and/or display the leakage information.

Preferably, the diagnostic device 8 and/or the valve module 4 is configured to deactivate a closed-loop pressure control of the valve module output pressure by the valve module 4 in the leakage detection mode. By deactivating the closed-loop pressure control, it can be prevented in particular that the first actuator element 6A is moved out of the blocking position by the closed-loop pressure control and that the valve module output pressure is increased thereby. In particular, the valve module 4 is configured to leave both actuator elements 6 in the blocking position after they have been moved to the blocking position, in particular for the duration of the leakage detection mode and/or until the temporal course (of the valve module output pressure), on the basis of which the compressed air leakage is to be detected, has been fully detected, in particular by the valve module 4 and/or the diagnostic device 8.

Preferably, the diagnostic device 8 has a temporal reference course of the valve module output pressure and is configured to compare the detected temporal course (of the valve module output pressure) with the reference course in order to detect the compressed air leakage. Preferably, the diagnostic device 8 is configured to learn the reference course in a state in which there is no compressed air leakage at the working port 2, for example when the valve arrangement 10 and/or the valve module 4 are commissioned (i.e. put into operation).

Optionally, the diagnostic device 8 is configured to perform the compressed air leakage detection on the basis of a time course of the current of the electric drive device. For example, the diagnostic device 8 is configured to correlate the temporal current course with a temporal course of the valve module output pressure and to detect an increase in a current of the first electric drive 11 (in particular compared to a reference value for the current), and to conclude the compressed air leakage on the basis of the detected increased current and preferably to provide the leakage information.

Preferably, the compressed air leakage detection may be performed in a downstream system, for example, the superordinate unit 33, the server 34, the cloud server 35, and/or the user device 36. Furthermore, the compressed air leakage detection may expediently be performed in the valve module 4 itself.

In the following, the compressed air consumption detection and the compressed air consumer localization will be described in more detail. The compressed air consumption detection relates in particular to the detection of a compressed air consumption of a valve module 4. The compressed air consumer localization relates in particular to the localization of a compressed air consumer, for example a valve module 4, within the valve arrangement 10.

As explained above, the valve arrangement 10 includes the supply unit 14 for supplying compressed air to the valve module 4. The supply unit 14 has the supply unit pressure sensor 15 for detecting the supply unit output pressure. Preferably, the diagnostic device 8 is configured to calculate a valve module flow rate based on the supply unit output pressure and the valve module output pressure, and to perform compressed air consumption detection and/or compressed air consumer localization based on the calculated valve module flow rate.

Preferably, the diagnostic device 8 is configured to calculate a respective valve module flow rate for several or for each valve module 4, in each case on the basis of the supply unit output pressure of that supply unit 14 which supplies the respective valve module 4 with the compressed air and on the basis of the valve module output pressure of the respective valve module 4. Expediently, each supply unit 14 detects its own supply unit output pressure. Each supply unit 14 is pneumatically connected by its pneumatic output to one or more supply ports 1 of one or more valve modules 4 via a respective second hose section 42.

The supply unit output pressure (detected by the supply unit 14) and the valve module output pressure (detected by the valve module 4) are on the same pneumatic path running through the valve module 4, so that the valve module flow through the valve module 4 can be calculated based on these pressures, for example by the diagnostic device 8.

Preferably, the diagnostic device 8 is configured to take into account the detected stroke of at least one actuator element 6 of the valve module 4, in particular the detected stroke of the first actuator element 6A, when calculating the valve module flow rate.

Preferably, each pneumatic plant has a supply unit 14 that can measure its supply unit flow rate and supply unit output pressure at its output. Expediently, the valve arrangement 10, in particular the diagnostic device 8, is configured to determine how much compressed air and/or pneumatic power each pneumatic plant consumes on the basis of the measured supply unit flow rates and/or supply unit output pressures. Preferably, the diagnostic device 8 is configured to calculate the respective compressed air consumption for each valve module in the pneumatic plant on the basis of the detected valve module output pressure of each valve module 4 and the detected supply unit output pressure of the supply unit 14 assigned to the valve module 4 (i.e., the supply unit 14 that supplies the valve module 4 with compressed air). The flow rate of the valve module 4 can be calculated from the supply unit output pressure and the valve module output pressure as well as the internal stroke of the actuator element 6 of the valve module 4.

For example, a supply unit 14 supplies several valve modules 4 with compressed air, so that exemplarily several valve modules 4—for example a first valve module 4, a second valve module 4 and a third valve module 4—are pneumatically connected to the same output of the supply unit 14. Expediently, the valve arrangement 10, in particular the diagnostic device 8, is configured to calculate a first valve module flow rate through the first valve module 4 on the basis of the supply unit output pressure detected by the supply unit pressure sensor 15—that is, the pressure present at the output of the supply unit 14—and the first valve module output pressure detected by the first valve module 4 and present at the working port 2 of the first valve module 4, and a detected first stroke of the first actuator element 6A of the first valve module 4. Expediently, the valve arrangement 10, in particular the diagnostic device 8, is configured to calculate a second valve module flow rate through the second valve module 4 on the basis of the detected supply unit output pressure and the second valve module output pressure detected by the second valve module 4 and present at the working port 2 of the second valve module 4 and a detected second stroke of the first actuator element 6A of the second valve module 4. Expediently, the valve arrangement 10, in particular the diagnostic device 8, is configured to calculate a third valve module flow rate through the third valve module 4 based on the detected supply unit output pressure and the third valve module output pressure detected by the third valve module 4 and present the working port 2 of the third valve module 4 and a detected third stroke of the first actuator element 6A of the third valve module 4.

Expediently, the valve arrangement 10, in particular the diagnostic device 8, is configured, in a case in which a pneumatic plant or a system part does not have a supply unit 14, to estimate for this pneumatic plant or system part a normal flow and/or a flow interval, in particular to learn this normal flow and/or flow interval using statistical methods.

Preferably, the diagnostic device 8 is configured to diagnose, for an application, in particular a pneumatic component 23, with permanent air consumption, for example for a nozzle and/or a filter, a fault, in particular a clogging and/or blockage of the pneumatic component 23, on the basis of a reduced stroke of the first actuator element 6A.

As discussed above, the valve arrangement 10 preferably includes multiple system levels, for example, a hall level 16, a plant level 17, and/or a component level 18. The plant level 17 can also be referred to as facility level. Exemplarily, each system level is superordinate or subordinate relative to another of the system levels. For example, the hall level 16 is superordinate to the plant level 17, and the plant level 17 is superordinate on the component level 18. Preferably, each system level is supplied with compressed air by the respective superordinate system level or supplies the respective subordinate system level with compressed air. As an example, the hall level 16 supplies the plant level 17 with compressed air and the plant level 17 supplies the component level 18 with compressed air.

Preferably, the valve arrangement 10 is configured to detect a respective system level flow of compressed air for each system level for the compressed air consumption detection and/or the compressed air leakage detection. In particular, the valve arrangement 10 is configured to detect a hall level flow rate of the flow of compressed air taking place through the hall level 16, for example by means of a flow sensor of the compressed air supply 28. Preferably, the valve arrangement 10 is configured to detect a system level flow rate of the flow of compressed air taking place through the plant level 17, for example by means of flow sensors of the supply units 14 and/or by means of a statistical calculation. Expediently, the valve arrangement 10 is configured to detect a component level flow of the flow of compressed air taking place through the component level 18, for example by means of the compressed air consumption detection described above, wherein for each valve module 4 a respective valve module flow is calculated based on the respective detected valve module output pressure and the associated supply unit output pressure.

Preferably, the diagnostic device 8 is configured to detect and/or localize pneumatic consumers at different system levels, in particular on the basis of compressed air consumption detection. In particular, the diagnostic device 8 is configured to calculate and/or visualize a hall consumption as the sum of all flows from supply units 14. Expediently, the diagnostic device 8 is configured to detect, in particular to visualize, for each plant, a plant consumption as a respective individual flow through a respective supply unit 14 of the respective plant. Preferably, the diagnostic device 8 is configured to calculate, in particular visualize, for each valve module 4 a respective component consumption based on the respective supply unit output pressure, the respective valve module output pressure and a respective detected stroke of the respective actuator element 6.

Preferably, the diagnostic device 8 is configured to perform a comparison between a first system level flow rate of a first system level and a second system level flow rate of a second system level subordinate to the first system level and to perform the compressed air leakage detection on the basis of the comparison.

For example, the diagnostic device 8 is configured to perform a comparison of the hall level flow rate (as the first system level flow rate) with the plant level flow rate (as the second system level flow rate) and/or a comparison of the plant level flow rate (as the first system level flow rate) with the component level flow rate (as the second system level flow rate) for the compressed air leakage detection.

Expediently, in response to a deviation between the first system level flow rate and the second system level flow rate exceeding a threshold value, the diagnostic device 8 is configured to determine that a compressed air leak is present and to provide leakage information indicating that the compressed air leak is present.

According to a preferred embodiment, the first system level flow is the supply unit flow of a single supply unit 14 and the second system level flow is the valve module flow of the valve modules 4 supplied with compressed air by the (single) supply unit 14.

Preferably, the diagnostic device 8 is configured to detect a differential flow rate between system levels on the basis of the detected system level flow rates and to determine a compressed air leakage on the basis of the differential flow rate. In particular, the diagnostic device 8 is configured to check whether a flow rate of the first system level is equal to the sum of the flow rates of the second system level subordinate to the first system level, and to determine on the basis of the check whether there is a compressed air leakage. Expediently, the diagnostic device 8 is configured to learn a tolerance value for flows in the valve arrangement 10 that cannot be measured, based on a statistical learning method, for example during a commissioning and/or during a maintenance interval. During maintenance intervals, manual adjustments to e.g. throttles can result in the flow rates change. This results in a deviation in the total flow.

Preferably, the diagnostic device 8 is configured to check whether the following condition (1) is met for the compressed air leakage detection:

$$\sum_i \text{flow}_i^{system\ level\ 2} + \text{deviation}_{min} \leq \\ \text{flow}^{system\ level\ 1} \leq \sum_i \text{flow}_i^{system\ level\ 2} + \text{deviation}_{max} \quad (1)$$

The term $\text{flow}^{system\ level\ 1}$ describes a flow rate in a first system level, for example a supply unit flow rate in the plant level 17. The term $\sum_i \text{flow}_i^{system\ level\ 2}$ describes a flow sum in a second system level subordinate to the first system level, for example the sum of the valve module flow rates of those valve modules 4 which are supplied with compressed air by the same supply unit 14. Expediently, the values $\text{deviation}_{min}$ and $\text{deviation}_{max}$ define a tolerance range.

The diagnostic device 8 is expediently configured to determine that there is no compressed air leakage in response to the above-mentioned condition (1) being satisfied and/or to determine that there is compressed air leakage in response to the above-mentioned condition (1) not being satisfied.

What is claimed is:

1. A valve arrangement for industrial automation, comprising at least one pneumatic valve module with a module housing, the at least one pneumatic valve module having a working port, an electric drive device, and at least one actuator element for setting a valve module output pressure at the working port and/or a flow rate through the working port, wherein the at least one actuator element is arranged in the module housing and is positionable by means of the electric drive device, wherein the valve module further has a valve module pressure sensor for detecting the valve module output pressure, the valve arrangement further comprising a diagnostic device which is configured to provide a diagnostic function on the basis of the detected valve module output pressure, the diagnostic function comprising a failure prognosis of the valve module, a compressed air leakage detection, a compressed air consumption detection and/or a compressed air consumer localization, and
    wherein the diagnostic device is configured to calculate the failure prognosis based on drive device current information associated with the electrical drive device.

2. The valve arrangement according to claim 1, wherein the diagnosis device is configured to calculate the failure prognosis on the basis of actuator element distance information, wherein the actuator element distance information represents a total distance covered by the at least one actuator element for the positioning of this actuator element.

3. The valve arrangement according to claim 2, wherein the valve module has an internal counter for counting strokes performed with the at least one actuator element and is adapted to provide the actuator element distance information using the internal counter.

4. The valve arrangement according to claim 1, wherein the drive device current information comprises an average current value, a maximum current value and/or a current current value.

5. The valve arrangement according to claim 1, wherein the diagnostic device is configured to detect reference current information and to calculate the failure prognosis based on the reference current information and the drive device current information.

6. The valve arrangement according to claim 1, wherein the valve module comprises a first actuator element and a second actuator element, and wherein the electric drive device comprises a first electric drive for positioning the first actuator element and a second electric drive for positioning the second actuator element, and the diagnostic device is configured to calculate the failure prognosis on the basis of first drive current information associated with the first electric drive and/or on the basis of second drive current information associated with the second electric drive.

7. The valve arrangement according to claim 1, wherein the diagnostic device is configured to calculate an integral over a diagnostic period on the basis of the drive device current information to obtain energy information, and to calculate the failure prognosis on the basis of the energy information.

8. The valve arrangement according to claim 7, wherein the diagnostic device is configured to calculate the diagnostic period on the basis of a time course of the valve module output pressure and/or on the basis of a time course of the drive device current information.

9. The valve arrangement according to claim 1, wherein the diagnostic device is configured to put the valve module into a leakage detection mode for the compressed air leakage detection, in which leakage detection mode the valve module first sets a predetermined valve module output pressure and immediately after the setting of the predetermined valve module output pressure positions the at least one actuator element in a blocking position, and to detect a compressed air leakage on the basis of a time course of the valve module output pressure detected in the leakage detection mode.

10. The valve arrangement according to claim 1, wherein the diagnostic device is configured to carry out the compressed air leakage detection on the basis of a temporal current course of the electrical drive device.

11. The valve arrangement according to claim 1, further comprising a supply unit for supplying compressed air to the valve module, the supply unit comprising a supply unit pressure sensor for detecting a supply unit output pressure, wherein the diagnostic device is configured to calculate a valve module flow rate based on the supply unit output pressure and the valve module output pressure and to perform the compressed air consumption detection and/or the compressed air consumer localization based on the calculated valve module flow rate.

12. The valve arrangement according to claim 1, comprising a plurality of system levels, each system level of the plurality of system levels being superordinate or subordinate relative to another system level of the plurality of system levels, and each system level of the plurality of system levels being supplied with compressed air from the respectively superordinate system level or supplying the respectively subordinate system level with compressed air, the valve arrangement being configured to detect a respective system level flow rate of compressed air for the compressed air consumption detection and/or the compressed air leakage detection for each system level.

13. The valve arrangement according to claim 12, wherein the diagnostic device is configured to perform a comparison between a first system level flow rate of a first system level and a second system level flow rate of a second system level subordinate to the first system level and to perform the compressed air leakage detection on the basis of the comparison.

14. The valve arrangement according to claim 1, wherein the valve module has an IO-Link communication interface.

15. The valve arrangement according to claim 1, wherein the actuator element is proportionally positionable by means of the electric drive device.

16. The valve arrangement according to claim 12, wherein the plurality of system levels comprises a hall level, a plant level and/or a component level.

17. A method of operating a valve arrangement for industrial automation, the valve arrangement comprising at least one pneumatic valve module with a module housing, the at least one pneumatic valve module having a working port, an electric drive device, and at least one actuator element for setting a valve module output pressure at the working port and/or a flow rate through the working port, wherein the at least one actuator element is arranged in the module housing and is positionable by means of the electric drive device, wherein the valve module further has a valve module pressure sensor for detecting the valve module output pressure, the valve arrangement further comprising a diagnostic device which is configured to provide a diagnostic function on the basis of the detected valve module output pressure, the diagnostic function comprising a failure prognosis of the valve module, a compressed air leakage detection, a compressed air consumption detection and/or a compressed air consumer localization, wherein the valve arrangement further comprises a supply unit for supplying compressed air to the valve module, the supply unit comprising a supply unit pressure sensor for detecting a supply unit output pressure, wherein the diagnostic device is configured to calculate a valve module flow rate based on the supply unit output pressure and the valve module output pressure and to perform the compressed air consumption detection and/or the compressed air consumer localization based on the calculated valve module flow rate, the method comprising the steps of:
  detecting the valve module output pressure; and
  providing the diagnostic function based on the detected valve module output pressure.

18. A valve arrangement for industrial automation, comprising at least one pneumatic valve module with a module housing, the at least one pneumatic valve module having a working port, an electric drive device, and at least one actuator element for setting a valve module output pressure at the working port and/or a flow rate through the working port, wherein the at least one actuator element is arranged in the module housing and is positionable by means of the electric drive device, wherein the valve module further has a valve module pressure sensor for detecting the valve module output pressure, the valve arrangement further comprising a diagnostic device which is configured to provide a diagnostic function on the basis of the detected valve module output pressure, the diagnostic function comprising a failure prognosis of the valve module, a compressed air leakage detection, a compressed air consumption detection and/or a compressed air consumer localization, and
  wherein the diagnostic device is configured to carry out the compressed air leakage detection on the basis of a temporal current course of the electrical drive device.

19. A valve arrangement for industrial automation, comprising at least one pneumatic valve module with a module housing, the at least one pneumatic valve module having a working port, an electric drive device, and at least one actuator element for setting a valve module output pressure at the working port and/or a flow rate through the working port, wherein the at least one actuator element is arranged in the module housing and is positionable by means of the electric drive device, wherein the valve module further has a valve module pressure sensor for detecting the valve module output pressure, the valve arrangement further comprising a diagnostic device which is configured to provide a diagnostic function on the basis of the detected valve module output pressure, the diagnostic function comprising a failure prognosis of the valve module, a compressed air leakage detection, a compressed air consumption detection and/or a compressed air consumer localization, and wherein the valve arrangement further comprises a supply unit for supplying compressed air to the valve module, the supply unit comprising a supply unit pressure sensor for detecting a supply unit output pressure, wherein the diagnostic device is configured to calculate a valve module flow rate based on the supply unit output pressure and the valve module output pressure and to perform the compressed air consumption detection and/or the compressed air consumer localization based on the calculated valve module flow rate.

\* \* \* \* \*